United States Patent [19]

Stanton et al.

[11] Patent Number: 4,695,114
[45] Date of Patent: Sep. 22, 1987

[54] LIGHTING FIXTURE

[76] Inventors: James R. Stanton, 1117 Wald Rd., Orlando, Fla. 32806; James R. Legg, 7314 Paprika La., Columbus, Ga. 31909

[21] Appl. No.: 849,803

[22] Filed: Apr. 9, 1986

[51] Int. Cl.[4] .......................................... H01R 13/60
[52] U.S. Cl. .................................... 439/573; 248/393; 362/404
[58] Field of Search ............... 339/119 L, 125 L, 135, 339/197 R, 197 B, 14 R; 362/404, 226; 248/27.1, 343

[56] References Cited

U.S. PATENT DOCUMENTS

| | | | |
|---|---|---|---|
| 1,001,421 | 8/1911 | McCandless | 362/404 |
| 1,478,870 | 12/1923 | Drees | 362/404 X |
| 1,544,736 | 7/1925 | Graham | 362/404 X |
| 2,861,121 | 11/1958 | Wolar | 248/343 X |
| 3,660,820 | 5/1972 | Liberman | 339/135 X |

Primary Examiner—Z. R. Bilinsky
Attorney, Agent, or Firm—William M. Hobby, III

[57] ABSTRACT

A lighting fixture hanging panel and bracket has a flat rigid panel having a large and small aperture therein, shaped to fix a suspended ceiling grid. The panel may be of heavy plywood for supporting a hanging light fixture. An elongated light fixture suspending bracket has a circular portion shaped to fit over an aperture in the panel with the circular portion having a plurality of threaded openings therein positioned to receive threaded fasteners from a lighting fixture being attached to the lighting fixture bracket. The lighting fixture suspending bracket circular portion also has an elongated opening therein, and a bracket electrical receptacle supporting tab fixedly holding an electrical receptacle adjacent to the lighting fixture suspending bracket elongated opening. A switch is attached to the lighting fixture suspending bracket and a pull cord extends therefrom through to the small aperture in the panel. The switch is connected to the receptacle so that a light fixture may be rapidly attached and removed in lighting fixture showrooms. The circular portion in the bracket may be sunken to align the bracket by placing the circular portion in the panel aperture.

6 Claims, 4 Drawing Figures

LIGHTING FIXTURE

BACKGROUND OF THE INVENTION

The present invention relates to a lighting fixture hanging system and especially to a lighting fixture hanging system for use in lighting fixture showrooms, whereby the lighting fixtures can be quickly attached for display and removed when sold.

In the past, a wide variety of systems and brackets have been provided for hanging light fixtures from room ceilings. A typical lighting fixture, however, is today hung directly to an electrical box. The electrical box is wired so that the lighting fixture can be wired directly to the wires therein. A fixture strap can be threaded directly across the electrical box and The lighting fixture canopy threaded to the fixture strap to support the hanging light fixture thereon.

A second common technique for hanging lamps directly to an electrical box uses a threaded lamp hickey attached to a threaded stud in the center of the electrical box. A threaded nipple can then be attached to the hickey with a lock-nut and the canopy can be slid over the threaded nipple and a collar threadedly attached thereto for holding the hanging lamp fixture.

A third technique used in wall-mounted fixtures attaches a fixture strap to a rectangular wall electrical box and then attach a nipple to the center of the fixture strap with the nipple extending through the wall fixture to hold the fixture with a center nut threaded to the nipple. Some simpler ceiling lighting fixtures are tab mounted and are attached with mounting screws passing directly through the canopy into the electrical box threaded tabs.

The present invention, on the other hand, is directed to hanging lighting fixtures in the lighting fixture showrooms where the lighting fixtures can be rapidly attached to the ceiling for an attractive display and can be quickly removed and returned to the box when sold. This system includes a built-in switch so that a switch is unnecessary for the lighting fixture. The lighting fixture canopy can be attached directly to the bracket, or alternatively, the fixture strap can be attached in lieu thereof for use with a nipple attached to the fixture strap for use in connection with stud mounted fixtures. A heavy plywood panel is used in a suspended ceiling system in place of ceiling tiles to give the strength to support the hanging light fixtures.

SUMMARY OF THE INVENTION

A lighting fixture hanging system has a flat panel, such as a plywood panel, having a large aperture and a small aperture therein. The panel is shaped to fit in a suspended ceiling grid. An elongated light fixture suspending bracket is attached to the plywood panel and has a circular portion shaped to fit over and to align with the larger aperture in the plywood panel. The bracket's circular portion has a plurality of threaded openings therein positioning to receive threaded fasteners from a lighting fixture bracket or from a fixture strap with the circular portion also having an elongated opening therein. An electrical receptacle support is fixed to the bracket and fixedly holds an electrical receptacle adjacent the lighting fixture suspending bracket elongated opening. A switch is attached to the bracket and has a pull-cord extending therefrom through the small aperture in the plywood panel. A switch is electrically connected to the receptacle to switch the receptacle power on and off with the pull-cord. The bracket is bolted to the ceiling panel and allows a lighting fixture to be plugged into the receptacle and quickly attached through the hanging lamp canopy with threaded fasteners directly to the bracket.

BRIEF DESCRIPTION OF THE DRAWINGS

Other objects, features and advantages of the present invention will be apparent from the written description and the drawings in which.

DESCRIPTION OF THE PREFERRED EMBODIMENTS

Figure 1:
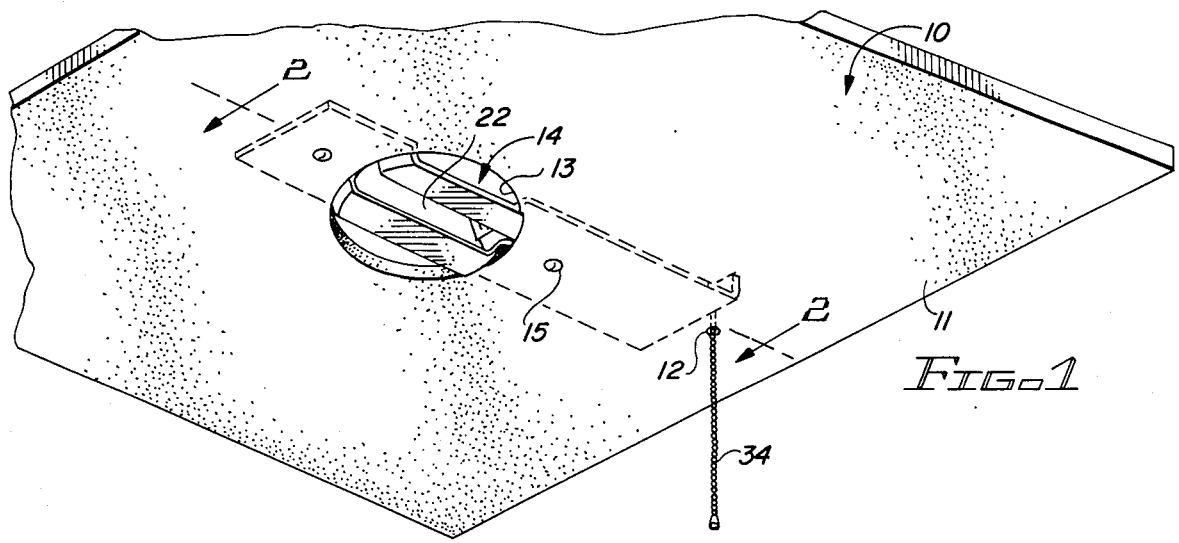
FIG. 1 is a perspective view of a lighting fixture hanging system in accordance with the present invention.
Figure 2:
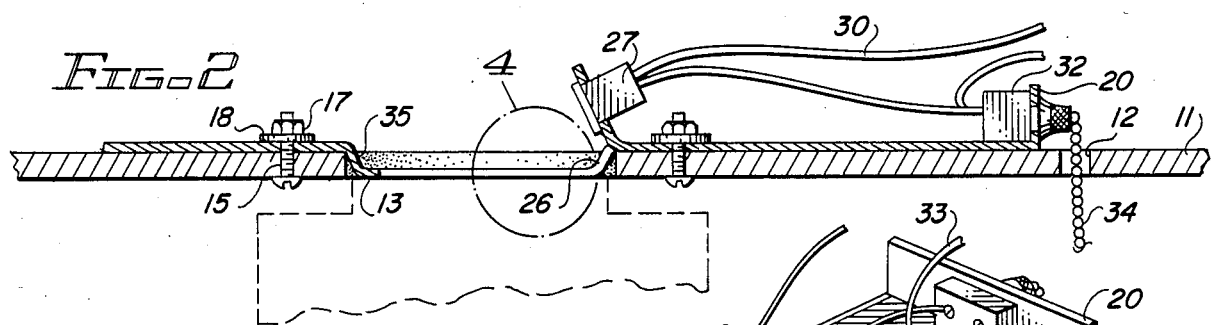
FIG. 2 is a sectional view taken on line 2—2 of FIG. 1.
Figure 3:
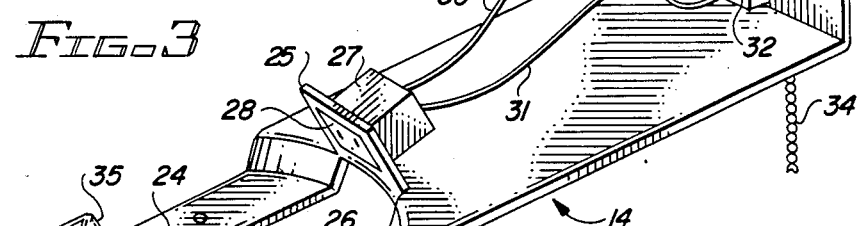
FIG. 3 is a perspective view of a lighting fixture hanging bracket.
Figure 4:
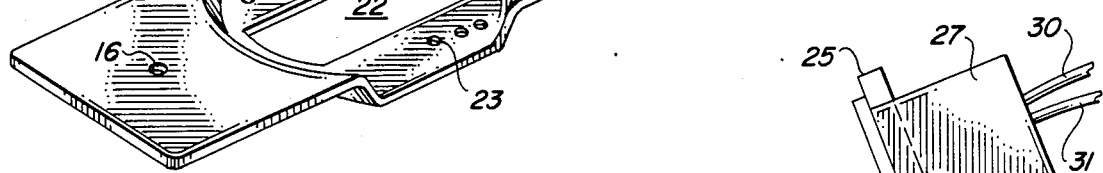
FIG. 4 is a sectional view taken on the circle 4 of FIG. 2.
Figure 4:
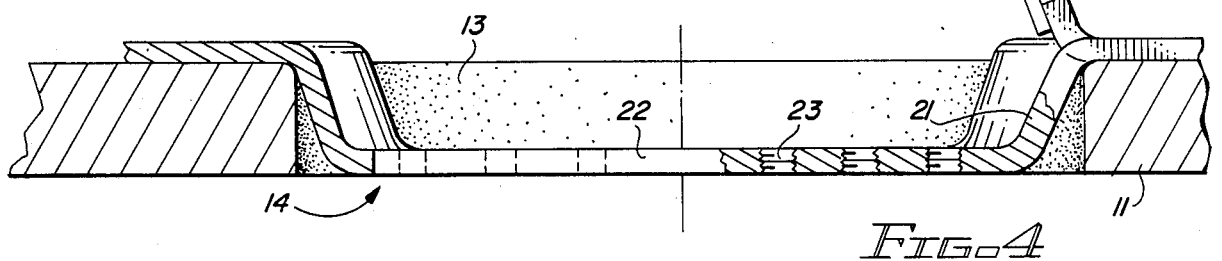

Referring to FIGS. 1 through 4 of the drawings, a lighting fixture hanging system 10 is illustrated having a ceiling panel 11 which may be made of plywood or other material for supporting light fixtures directly thereto. The panel is shaped to fit within a suspended ceiling grid to be supported thereon. The panel 11 has a small aperture 12 and a large aperture 13, and has an elongated lighting fixture suspending bracket 14 attached thereto with bolts 15 extending through the panel 11 and through apertures 16 in the bracket 14 and attached thereto with nuts 17 and washers 18. The bracket 14 is an elongated flat panel with a vertically extending end portion 20 and a generally circular dropped portion 21. The circular dropped portion has an elongated generally rectangular opening 22 therethrough and a plurality of threaded openings 23 on one side of the opening 22 and a plurality of threaded openings 24 on the other side of the opening 22.

An electrical receptacle support tab 25 is attached to the bracket 14 at one end 26 of the elongated opening 22. The electrical receptacle 27 has its electrical contact openings 28 facing the opening 22 and positioned at an angle for easy access for inserting an electrical plug through the opening plug into the electrical receptacle 27. The electrical receptable has a neutral conductor 30 attached thereto and a second conductor 31 connected from the receptacle to a switch 32. The switch in turn has a hot conductor 33 extending therefrom. The switch is attached through an opening in the upwardly extending portion 20 of the bracket 14, and has a pull-cord 34 extending therefrom and through the small aperture so that the receptacle 27 may have 120 volts AC switched through the switch by pulling on the pull-cord 34 and may thus control a lighting fixture separate from any switches the lighting fixture may have. The circular dropped portion 21 has a generally circular dropped walls 35 which serve to align the bracket with the large opening 13 for fast assembly of the lighting fixture hanging system. The panels 10, of course have the brackets attached thereto when shipped.

In operation, a suspended ceiling grid work is attached to a ceiling and plywood panels 10 can be placed therein in place of the conventional tiles, since plywood is much heavier and will support the hanging light fixtures. To hang a lamp fixture to the bracket 14 merely requires that the hanging fixture end wires be attached to a receptacle plug with solderless connectors so that the hanging fixtures can then be plugged into the receptacle 27 by the wire extending through the opening 22. The canopy of the hanging fixture can then be attached directly to the ceiling panel 10 by connecting the threads to the openings 23 and 24 which are spaced for different sized canopy screw openings. In the event of a canopy not fitting the existing predrilled and threaded holes 23 and 24, a fixture strap can be attached thereacross and the canopy attached directly thereto for supporting a lamp. The fixture strap can also be utilized in any case requiring a nipple for the hanging of the hanging light fixture. The lamp can then be switched with the pull-cord 34. To remove the light fixture merely requires the switching off of the switch 32, removing the two screws holding the lamp fixture canopy to the threaded openings 23 and 24 of the hanging bracket 14 and unplugging the electrical plug from the receptacle 27. The electrical plug can then be removed from the fixture by removing the solderless connectors. An advantage of the present lighting fixture hanging system is that the prefabricated panels 10 with the brackets 14 attached can be easily manufactured in any size desired and rapidly placed in a suspended ceiling supporting grid work.

It should be clear at this time that a lighting fixture hanging system has been provided for use in showrooms and retail outlets in stores in which stronger panels having the hanging bracket attached thereto can be placed in a suspended ceiling and lighting fixtures can be attached for display and rapidly removed therefrom for sale. However, it should be clear that the present invention is not to be considered limited to the forms shown which are to be considered illustrative rather than restrictive.

I claim:

1. A lighting fixture hanging system comprising in combination:

a flat rectangular panel having a pair of apertures therein and shaped to fit in a suspended grid;

an elongated generally flat lighting fixture suspending bracket having pair of end portions and a circular dropped portion shaped to fit over and align with one aperture in said flat rectangular panel and having a plurality of threaded openings therein positioned to receive threaded fasteners from a lighting fixture, and said lighting fixture suspending bracket circular portion having an elongated opening therein;

an electrical receptacle support tab being fixedly attached to the lighting fixture suspending bracket and fixedly holding an electrical receptacle therein adjacent to the lighting fixture suspending bracket elongated opening; and said elongated lighting fixtures suspending bracket also having a switch attached to one end portion thereof and having a pull-cord extending from the switch through an aperture in the panel whereby a lighting fixture can be plugged into a receptacle and attached to a lighting fixture suspending bracket and switched with a pull-cord switch.

2. A lighting fixture hanging system in accordance with claim 1 in which said electrical receptacle is connected through said electrical switch for switching said receptacle on and off responsive to pulling the pull-cord.

3. A lighting fixture hanging system in accordance with claim 2 in which said electrical receptacle and switch are connected to an alternating current electrical supply.

4. A lighting fixture hanging system in accordance with claim 3 in which said lighting fixture suspending bracket has a plurality of apertures therein for bolting said bracket to said panel with said circular portion aligned in the larger aperture in said panel.

5. A lighting fixture hanging system in accordance with claim 4 in which said bracket electrical receptacle support tab is positioned adjacent said elongated opening in said bracket and is angled to position the receptacle facing the elongated opening in said bracket.

6. A lighting fixture hanging system in accordance with claim 5 in which said lighting fixture suspended bracket circular portion opening has a generally rectangular shape therethrough.

* * * * *